US006818709B1

United States Patent
Vicari

(10) Patent No.: US 6,818,709 B1
(45) Date of Patent: Nov. 16, 2004

(54) PRODUCTION OF VINYL ALCOHOL COPOLYMERS

(75) Inventor: Richard Vicari, Pearland, TX (US)

(73) Assignee: Celanese International Corporation, Dallas, TX (US)

( * ) Notice: Subject to any disclaimer, the term of this patent is extended or adjusted under 35 U.S.C. 154(b) by 0 days.

(21) Appl. No.: 10/618,248

(22) Filed: Jul. 11, 2003

(51) Int. Cl.$^7$ ................................................ C08F 2/06
(52) U.S. Cl. ..................... 526/65; 526/67; 526/303.1; 526/310; 526/330
(58) Field of Search .................. 526/65, 67, 303.1, 526/310, 330

(56) References Cited

FOREIGN PATENT DOCUMENTS

| JP | 06233241 | * | 7/1987 |
| JP | 62-33241 (1987) | | 7/1987 |

* cited by examiner

*Primary Examiner*—William K. Cheung
(74) *Attorney, Agent, or Firm*—M. Susan Spiering

(57) ABSTRACT

A novel process is disclosed for the continuous process for making a vinyl acetate/acrylamido copolymer product, employing vinyl alcohol and 2-acrylamido-2-methyl propane sulfonic acid or a salt of such acid (AMPS). The process generally includes feeding with agitation, vinyl acetate and ANTS as a comonomer, a polymerization initiator, and a solvent so as to produce the desired product.

38 Claims, No Drawings

PRODUCTION OF VINYL ALCOHOL COPOLYMERS

BACKGROUND OF THE INVENTION

Copolymers of vinyl alcohol (VOH) with a minor amount of 2-acrylamido-2-methyl propane sulfonic acid in free acid form or as a salt of the free acid (AMPS) are known in the art and are useful for various applications, e.g., the production of cold water soluble films which can be formed into containers for predetermined batches of soaps and detergents, temporary sizing for new garments prior to their first washing and oil drilling applications where these copolymers can serve for the temporary shoring up of concrete supports used to maintain the integrity of wells prior to the setting of the concrete.

A problem with the production of these copolymers by prior art methods is that it is difficult to produce the copolymer with a sufficiently high content of polymerized AMPS while maintaining satisfactory levels of productivity and avoiding compositional drift, i.e., unacceptable variations in the content of AMPS in the copolymer from one batch to the next. Thus, any process which is capable of producing VOWAMPS copolymers with satisfactory loading of polymerized AMPS, combined with relatively high productivity and low compositional drift, is much to be desired.

BRIEF SUMMARY OF THE INVENTION

In accordance with this invention, a process is provided for the production of a copolymer of vinyl alcohol (VOH) and 2-acrylamido-2-methyl propane sulfonic acid or a salt of such acid (AMPS) by steps including continuously feeding with agitation, vinyl acetate (VAM) and AMPS as comonomers, a free radical yielding polymerization initiator, and a solvent for said comonomers, initiator, and copolymer resulting from the copolymerization of said comonomers, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifying by hydrolysis and/or alcoholyses a major proportion of the acetate groups in said copolymer to form a copolymer of VOH and AMPS.

DETAILED DESCRIPTION OF THE INVENTION

In carrying out the foregoing process the comonomer with VAM may be the free acid form of AMPS or the sodium, potassium, or ammonium salt of such free acid form.

The free radical yielding polymerization initiator utilized for the copolymerization of VAc and AMPS or salt of AMP may be, for example, 2-ethylhexyl peroxydicarbonate (Trigonox EHP), 2,2'-azobisisobutyronitrile (AIBN), t-butyl peroxyneodecanoate, bis(4-t-butylcyclohexyl) peroxydicarbonate, di-n-propyl peroxydicarbonate, di-n-butyl peroxydicarbonate, di-cetyl peroxydicarbonate, di-s-butyl peroxydicarbonate. Essentially any initiator able to generate free radicals can be used.

Optionally, acetaldehyde (AcH) as a chain transfer agent can be continuously fed to the first reaction zone with the other components. The amount of AcH may, for example, be up to about 0.2 wt. % based on the total of VAM and AcH being added.

A solvent for the comonomers VAM and AMPS, the polymerization initiator and the copolymer being formed in the two reaction zones is generally employed in the process. Suitable solvents are, for example, methanol, ethanol, and propanol. The preferred solvent is methanol.

The amount of AMPS continuously fed to both reaction zones is, for example, about 1 to about 20 wt. %, preferably about 4 to 15 wt. % based on the total of VAM and AMPS being fed. The "split" or ratio between the amounts of AMPS fed to the first and second reaction zones, respectively, may be, for example, from about 55:45 to about 80:20.

The amount of polymerization initiator fed to the first reaction zone may be, for example, about 0.0001 to about 1 wt. % based on the weight of VAM being fed.

The amount of solvent fed to the first reaction zone may be, for example, about 10 to about 40 wt. % based on the weight of VAM being fed. The polymerization initiator is preferably fed to the first reaction zone as a solution in the solvent at a concentration in the solvent of about 0.1 to about 10 wt. % based on the weight of the solution.

The average residence time in the first reaction zone of the components fed to the fust reaction zone may be, for example, in the range of about 30 to about 120 minutes, preferably about 45 to about 70 minutes.

The reaction temperature in the first reaction zone is, for example, about 55 to about 85° C., preferably about 60 to about 80° C.

The average residence time in the second reaction zone of the components in the effluent from the first reaction one and the additional AMPS fed to the second reaction zone may be, for example, in the range of about 30 to about 120 minutes, preferably about 45 to about 70 minutes, for any 12 hour period.

The reaction temperature in the second reaction zone may be, for example, about 55 to about 85° C., preferably about 60 to about 80° C.

The pressure in each reaction zone may be in the range, for example, of about 1 to about 30 psi, preferably about 3 to about 15 psi.

The residence times and temperatures in the first and second reaction zones are generally sufficient to result in the polymerization of substantially all of the AMPS fed to the system although a small percentage of VAM added to the system may remain unpolymerized.

The polymer solids content in the effluent from the second reaction zone may be, for example, in the range of about 40 to about 85%, preferably about 55 to about 75%, while the percent conversion calculated from actual polymer solids content and the theoretical polymer solids content equal to the amount of monomers added may be in the range of about 70 to about 99%, preferably about 80 to about 98%. The molecular weight of the copolymer from the second reaction zone indicated by the viscosity of a 15 wt. % solution in methanol is in the range, for example, of about 4 to about 200 cps preferably about 7 to about 30 cps.

In carrying out the saponification step resulting in VOH/AMPS copolymers, the effluent from the second reaction zone may, for example, be fed to a stripping column to remove the more volatile components such as unreacted VAM from the copolymer of VAM and AMPS. The resulting "paste" is then mixed with an aqueous solution of a strong base such as sodium hydroxide, e.g., containing about 10 to about 50 wt. % of sodium hydroxide to provide base at a caustic mole ratio (CMR, ratio of moles of base to moles of acetate in the copolymer) of about 0.01 to about 0.1. Optionally, an amount of a volatile alcohol, e.g., methanol, is also added to reduce the solids content in the paste to about 30 to about 65 wt. %. The resulting mass is then allowed to react at a temperature from about room temperature (RT, about 22° C.), to about 50° C. for a period, e.g., about 5 minutes to about 24 hours to obtain a percent hydrolysis of the acetate groups in the copolymer to hydroxyl groups, e.g., in the range of about 70 to about 99+%, preferably in the range of about 80 to about 95%.

The saponified copolymer of VOH and AMPS may have, for example, about 1 to about 8 mol % of polymerized AMPS (poly AMPS), about 1 to about 20 mol % of polymerized VAM (PVAc) and about 75 to about 98 mol % of polymerized vinyl alcohol (PVOH), preferably about 2 to about 4 mol % of poly AMPS, about 5 to about 10 mol % of PVAc, and about 85 to about 95 mol % of PVOH, a degree of hydrolysis of, for example, about 70 to about 99+%, preferably about 80 to about 95% indicated by $C^{13}$NMR and a relative molecular weight indicated by the viscosity of a 4% aqueous-solution of the VOH copolymer of, for example, about 3 to about 30 cps, preferably about 7 to about 10 cps.

The following examples further illustrate the invention. Examples 1–11 describe the preparation of copolymers of VAM and the sodium salt of a copolymer of 2-acrylamido-2-methyl propane sulfonic propane sulfonic acid (SAMPS) by a continuous process under varying process conditions.

Polymerizations were performed using two jacketed 2-L glass reactors in series fitted with reflux condensers, mechanical stirrers and feed lines. Reactor 1 was fed continuously with vinyl acetate (VAM), which, in some examples, contained acetaldehyde (AcH), methanol containing di(ethylhexyl) peroxy dicarbonate (EHP) initiator, and SAMPS, each as a separate feed line using metering pumps. To ensure accurate feedrates, each feed was placed on a balance and the feedrates checked by measuring the weight difference with time. SAMPS was also fed continuously to the second reactor to minimize compositional drift (the split between Reactor 1 and Reactor 2 was 75:25). Table 1 lists the feedrates and initiator and aldehyde concentrations for the runs. Reactor 1 temperature was 60° C. and Reactor 2 temperature was 64° C. The residence time was 1 hour in each reactor. The polymer solution coming out of Reactor 2 was fed into an Oldershaw column to remove residual vinyl acetate using methanol vapors. Each run was 12 hours long to ensure the polymerization was lined-out

TABLE 1

Feedrates for the Continuous Polymerization Runs

| | Concentration, wt. % | | Feedrate, g/min | | |
|---|---|---|---|---|---|
| Example | % EHP in MeOH | % AcH in VAM | VAM/AcH | SAMPS | MeOH/EHP |
| 1 | 4.11 | 0 | 15.69 | 1.08 | 5.73 |
| 2 | 6.98 | 0 | 16.63 | 2.29 | 3.58 |
| 3 | 1.41 | 0 | 15.07 | 2.08 | 5.35 |
| 4 | 4.11 | 0 | 14.97 | 2.06 | 5.46 |
| 5 | 4.11 | 1.96 | 15.07 | 2.04 | 5.39 |
| 6 | 2.44 | 0 | 17.66 | 1.22 | 3.62 |
| 7 | 2.44 | 1.96 | 16.84 | 2.28 | 3.38 |
| 8 | 1.41 | 1.96 | 15.89 | 1.07 | 5.53 |
| 9 | 6.98 | 1.96 | 17.6 | 1.19 | 3.71 |

TABLE 1-continued

Feedrates for the Continuous Polymerization Runs

| | Concentration, wt. % | | Feedrate, g/min | | |
|---|---|---|---|---|---|
| Example | % EHP in MeOH | % AcH in VAM | VAM/AcH | SAMPS | MeOH/EHP |
| 10 | 3.51 | 0.99 | 16.25 | 1.66 | 4.59 |
| 11 | 3.51 | 0.99 | 16.25 | 1.66 | 4.59 |

Table 2 indicates the results from the polymerization of SAMPS with vinyl acetate in the examples, including relative molecular weight of the polymer indicated by the viscosity of a 15% solution in methanol, the actual percentage of solids in Reactor 2 and the percent conversions (figures in parentheses) calculated from the actual percent solids and theoretical percent solids (figures not in parentheses).

TABLE 2

Results From the Polymerization of SAMPS With Vinyl Acetate

| Example | 15% viscosity, cps | Reactor 2 solids | Theoretical solids (Conversion) |
|---|---|---|---|
| 1 | 7.3 | 72.4% | 74% (97.84%) |
| 2 | 8.9 | 79.80% | 83.65% (95.4%) |
| 3 | 13.5 | 70% | 75% (93%) |
| 4 | 7.3 | 6840% | 74.89 (91.33%) |
| 5 | 5.1 | 65.80% | 75.24% (87.45%) |
| 6 | 15.7 | 77.60% | 83.63% (92.79%) |
| 7 | 8.8 | 69.70% | 84.41% (82.57%) |
| 8 | 7.2 | 63% | 74.96% (84.04%) |
| 9 | 6.3 | 77.30% | 83.40% (92.59%) |
| 10 | 7 | 70.20% | 79.07% (88.78%) |
| 11 | 7.8 | 70.80% | 79.07% (89.55%) |

Table 2 shows the overall conversion of vinyl acetate and SAMPS into polymer. Based on these theoretical solids levels, which are directly related to the conversion of monomers to copolymer, the conversions range from 83% to 98%. No residual SAMPS were detected by $C^{13}$NMR in any of the runs.

Saponification of the VAM/SAMPS copolymers was accomplished by treating the paste obtained from the Oldershaw column used to strip VAM from the effluent from Reactor 2 with 50 wt % aqueous NaOH at various values of caustic mole ratio (CMR) further diluted with methanol so that the solids content was 35 wt. %. Examples 12–17 illustrate the effect of varying conditions of saponification carried out on the VAM/SAMPS copolymer of Example 3, with the results shown in Table 3.

TABLE 3

Saponification of PVAc-AMPS

| Example | CMR | Time of saponification | Temp of saponification | % hydrolysis | Target hydrolysis |
|---|---|---|---|---|---|
| 12 | 0.035 | 17 hours | RT C | 96.45 | 99 |
| 13 | 0.045 | 17 hours | 40 C | Ca. 97 | 99 |
| 14 | 0.03 | 17 hours | RT C | 95.80 | 95 |
| 15 | 0.01 | 2 hours | RT C | 84.62 | 88 |
| 16 | 0.01 | 2 hours | RT C | 81.40 | 88 |
| 17 | 0.015 | 2.5 hours | RT C | 92.60 | 88 |

RT = room temperature

Caustic mole ratio (CMR) was calculated with the assumption the polymer is 100% PVAc. The small amount of co-AMPS was ignored in the CMR calculation.

As stated, the 50% NaOH was diluted with enough MeOH when added to the paste to dilute the solids to 35%. The NaOH/MeOH was mixed into the paste by hand (10 to 20 min. of mixing) at room temperature. The 40 C saponification gelled after about 1 minute of mixing. The paste was then allowed to react for the time and temperature shown in the above table. Saponification procedures similar to those described in Examples 12–17 were carried out on the polymers of Examples 1–11.

Table 4 shows the compositions and properties of the saponified polymers for each of the examples of Tables 1 and 2 including mol percents of polymerized SAMPS (SAMPS), polymerized VAM (PVAc) and polymerized vinyl alcohol (PVOH), degree of hydrolysis indicated by $C^{13}NMR$, relative molecular weight as indicated by the viscosity of a 4% solution water and degree of hydrolysis indicated by titration.

TABLE 4

Composition of Copolymer and Final Viscosity

| | Composition of Saponified Polymer by $C^{13}NMR$ | | | | Final Results | |
|---|---|---|---|---|---|---|
| Example | SAMPS, mol % | PVAc, mol % | PVOH, mol % | Degree of hydrolysis, % ($C^{13}NMR$) | 4% viscosity, cps | Degree of hydrolysis, % (titration) |
| 1 | 1.31 | 4.44 | 94.25 | 95.5 | 3.92 | 95.65 |
| 2 | 2.87 | 2.48 | 94.65 | 97.45 | 4.37 | 96.68 |
| 3 | 3.39 | 2.46 | 94.15 | 97.46 | 5 | 98.91 |
| 4 | 3.42 | 1.52 | 95.06 | 98.43 | 3.94 | 96.24 |
| 5 | 3.12 | 2.42 | 94.46 | 97.5 | 2.59 | 98.41 |
| 6 | 1.48 | 2.09 | 95.53 | 96.96 | 6.11 | 97.43 |
| 7 | 2.83 | 2.23 | 94.94 | 97.7 | 3.71 | 98.37 |
| 8 | 1.6 | 1.26 | 97.14 | 98.72 | 3.58 | 98.91 |
| 9 | 1.54 | 1.31 | 97.15 | 98.67 | 2.97 | 98.72 |
| 10 | 2.03 | 1.79 | 96.18 | 98.17 | 3.53 | 98.47 |
| 11 | 2.07 | 2.45 | 95.48 | 97.49 | 3.78 | 97.85 |

$C^{13}NMR$ spectroscopy was used to determine the copolymer composition and the randomness of the SAMPS in the copolymer. The SAMPS feedrate was the only variable to control the SAMPS loading in the copolymer.

The date in Tables 1–4 indicates that copolymers of VOH and AMPS can be obtained at relatively high AMPS loadings, high conversion rates and productivity, high degree of hydrolysis and relatively low compositional drift, using the continuous process of this invention.

More generally, the invention includes a continuous process for making vinyl acetate/acrylamide or acrylamide derivative copolymers. Acrylamide or acrylamide derivative monomers and copolymers incorporating them are referred to herein as acrylamido comonomers and acrylamido copolymers, respectively, for purposes of convenience. There is thus provided in accordance with the invention a continuous process for making a vinyl acetate/acrylamido copolymer comprising: (a) continuously supplying a reaction mixture including vinyl acetate and a more reactive acrylarnido comonomer to a reaction zone wherein the vinyl acetate and acrylamido comonomer are at least partially consumed to form an intermediate reaction mixture; (b) continuously supplying to the intermediate reaction mixture a stream enriched with respect to the more reactive acrylamido comonomer and copolymerizing the additional acrylamido comonomer with the intermediate reaction mixture to form a vinyl acetate/acrylanrido copolymer product; and (c) continuously recovering the vinyl acetatelacrylamido copolymer product.

What is claimed is:

1. A process for the production of a copolymer of vinyl alcohol (VOH) and 2-acrylamido-2-methyl propane sulfonic acid or a salt of such acid (AMPS) by steps including continuously feeding with agitation, vinyl acetate (VAM) and AMPS as comonomers, a free radical yielding polymerization initiator, and a solvent for said comonomers, initiator, and copolymer resulting from the copolymerization of said comonomers, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifing by hydrolysis and/or alcoholysis a major proportion of the acetate groups in said copolymer to form a copolymer of VOH and AMPS.

2. The process of claim 1, wherein up to 0.2 wt. % of acetaldehyde (AcH) is continuously fed to the first reaction zone, based on the total of VAM and ACH being fed.

3. The process of claim 1, wherein said solvent is methanol, ethanol or propanol.

4. The process of claim 3, wherein said solvent is methanol.

5. The process of claim 1, wherein the total amount of AMPS fed to both reaction zones is about 1 to about 20 wt. % based on the total of VAM and AMPS being fed.

6. The process of claim 5, wherein said total amount of AMPS is about 4 to about 15 wt. %.

7. The process of claim 1, wherein the amount of said solvent fed to the first reaction zone is about 10 to about 40 wt. % based on the weight of VAM being fed.

8. The process of claim 1, wherein the average residence time in the first and second reaction zones of the components fed to the said reaction zones is about 30 to about 120 minutes.

9. The process of claim 8, wherein said average residence time is about 45 to about 70 minutes.

10. The process of claim 1, wherein the reaction temperature in said first and second reaction zones is about 55 to about 85° C.

11. The process of claim 10, wherein said reaction temperature is about 60 to 80° C.

12. The process of claim 1, wherein the average reaction pressure in each reaction zone is about 1 to about 30 psi.

13. The process of claim 1, wherein said reaction pressure is about 3 to about 15 psi.

14. The process of claim 1, wherein the residence times and temperatures in the first and second reaction zone result in the polymerization of substantially all the AMPS fed to the system.

15. The process of claim 1, wherein the effluent from said second reaction zone has an actual polymer solids content of about 40 to about 85% and the percent conversion calculated from said actual polymer solids content and the theoretical polymer solids content equal to the amount of monomers added to the system is about 70 to about 99%.

16. The process of claim 1, wherein the relative molecular weight of the VAM/AMPS copolymer obtained from the second reaction zone is indicated by a viscosity of a 15 wt. % solution of the copolymer in methanol of about 4 to about 30 cps.

17. The process of claim 16, wherein said percent conversion is about 80 to about 98%.

18. The process of claim 1, wherein the saponified copolymer of VOH and AMPS contains about 1 to about 8 mol % of polymerized AMPS (poly AMPS), about 1 to about 20 mol % of polymerized VAM (PVAc) and about 75 to about 98 mol % of polymerized VOH (PVOH), a degree of hydrolysis of about 70 to at least 99% indicated by C13NMR and a relative molecular weight indicated by a viscosity of a 4% aqueous solution of the VOH copolymer of about 3 to about 30 cps.

19. The process of claim 18, wherein said saponified copolymer contains about 2 to about 4 mol % of poly AMPS, about 5 to about 10 mol % of PVAc, and about 85 to about 95 of PVOH, said degree of hydrolysis is about 80 to about 95%, and said viscosity of a 4% aqueous solution of the VOH copolymer is about 7 to about 10 cps.

20. A process for producing a vinyl alcohol/acrylamido copolymer comprising:

(a) supplying a reaction mixture comprising vinyl acetate monomer and a acrylamido monomer to a first reaction zone wherein the vinyl acetate monomer and the acrylamido monomer are at least partially copolymerized to form a first reaction product comprising vinyl acetate/acrylamido copolymer;

(b) transferring the first reaction product to a second reaction zone; and (c) supplying a stream comprising acrylarnido monomer to the second reaction zone in the presence of the first reaction product and copolymerizing at least a portion of the acrylamido monomer in the stream with the first reaction product to form a second reaction product comprising vinyl acetate/acrylamido copolymer;

(d) saponifying at least a portion of the vinyl acetate/acrylamido copolymer produced in the second reaction zone to form a vinyl alcohol/acrylamido copolymer.

21. The process of claim 20, wherein the reaction mixture comprises up to 0.2 wt. % of acetaldehyde based on the total weight of the vinyl acetate monomer and acetaldehyde.

22. The process of claim 21, wherein the reaction mixture comprises a solvent and a free radical polymerization initiator.

23. The process of claim 22, wherein the reaction mixture comprises about 1.0 wt. % to about 20.0 wt. % acrylamido monomer based on the total weight of the vinyl acetate monomer and the and the acrylamido monomer.

24. The process of claim 23, wherein the reaction mixture comprises about 4.0 wt. % to about 15.0 wt. % acrylamido monomer based on the total weight of the vinyl acetate monomer.

25. The process of claim 24, wherein the average residence time of the reaction mixture components in the first reaction zone is about 30 to about 120 minutes.

26. The process of claim 25, wherein the average residence time of the first reaction product in the second reaction zone is about 45 to about 70 minutes.

27. The process of claim 26, wherein the temperature in the first and second reaction zones is about 55° C. to about 85° C.

28. The process of claim 26, wherein the average pressure in the first and second reaction zones is about 1 psi to about 30 psi.

29. The process of claim 25 wherein the vinyl alcohol/acrylamido copolymer has a degree of hydrolysis of about 70% to about 99% and a viscosity of about 3 cps to about 30 cps and comprises about 1 mol % to about 8 mol % of polymerized acrylamido monomer, about 1 to about 20 mol % of polymerized vinyl acetate monomer, and about 75 mol % to about 98 mol % of polymerized vinyl alcohol.

30. A process for producing a vinyl acetate/acrylamido copolymer comprising:

(d) supplying a reaction mixture comprising vinyl acetate monomer and a acrylamido monomer to a first reaction zone wherein the vinyl acetate monomer and the acrylamido monomer are at least partially copolymerized to form a first reaction product comprising vinyl acetate/acrylamido copolymer;

(e) transferring the first reaction product to a second reaction zone; and (f) supplying a stream comprising acrylamido monomer to the second reaction zone in the presence of the first reaction product and copolymerizing at least a portion of the acrylamido monomer in the stream with the first reaction product to form a second reaction product comprising vinyl acetate/acrylamido copolymer.

31. The process of claim 30, wherein the reaction mixture comprises up to 0.2 wt. % of acetaldehyde based on the total weight of the vinyl acetate monomer and acetaldehyde.

32. The process of claim 31, wherein the reaction mixture comprises a solvent and a free radical polymerization initiator.

33. The process of claim 32, wherein the reaction mixture comprises about 1.0 wt. % to about 20.0 wt. % acrylamido monomer based on the total weight of the vinyl acetate monomer and the acrylamido monomer.

34. The process of claim 33, wherein the reaction mixture comprises about 4.0 wt. % to about 15.0 wt. % acrylamido monomer based on the total weight of the vinyl acetate monomer.

35. The process of claim 34, wherein the average residence time of the reaction mixture components in the first reaction zone is about 30 to about 120 minutes.

36. The process of claim 35, wherein the average residence time of the first reaction product in the second reaction zone is about 45 to about 70 minutes.

37. The process of claim 36, wherein the temperature in the first and second reaction zones is about 55° C. to about 85° C.

38. The process of claim 37, wherein the average pressure in the first and second reaction zones is about 1 psi to about 30 psi.

* * * * *